(12) United States Patent
Kessler et al.

(10) Patent No.: US 8,648,503 B2
(45) Date of Patent: Feb. 11, 2014

(54) ARRANGEMENT FOR ACOUSTIC DECOUPLING OF A STATOR OF AN ELECTRIC MOTOR

(75) Inventors: Bernhard Kessler, Burkhardroth (DE); Christian Finger, Bad Kissinger (DE); Christian Schumpa, Grosslangheim (DE); Zhiguo Wang, Munich (DE)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 128 days.

(21) Appl. No.: 13/384,619

(22) PCT Filed: Jul. 9, 2010

(86) PCT No.: PCT/EP2010/059878
§ 371 (c)(1),
(2), (4) Date: Apr. 3, 2012

(87) PCT Pub. No.: WO2011/009739
PCT Pub. Date: Jan. 27, 2011

(65) Prior Publication Data
US 2012/0175976 A1   Jul. 12, 2012

(30) Foreign Application Priority Data
Jul. 21, 2009   (DE) .................. 10 2009 027 872

(51) Int. Cl.
*H02K 5/24*   (2006.01)

(52) U.S. Cl.
USPC .................................. 310/51; 310/89; 310/91

(58) Field of Classification Search
USPC .......................... 310/51, 88, 89, 91
See application file for complete search history.

(56) References Cited

U.S. PATENT DOCUMENTS

| 4,593,223 A | 6/1986 | Lehoczky |
| 5,196,749 A | 3/1993 | Palma et al. |
| 6,107,705 A * | 8/2000 | Durantay et al. ............... 310/51 |
| 6,628,027 B2 * | 9/2003 | Fuller ............................. 310/91 |
| 6,930,416 B1 * | 8/2005 | Remington et al. ............ 310/51 |
| 8,427,020 B2 * | 4/2013 | Hoffman et al. ............... 310/89 |
| 2004/0032177 A1 * | 2/2004 | Nitzsche et al. ............... 310/91 |

FOREIGN PATENT DOCUMENTS

| DE | 4109814 A1 | 10/1992 |
| DE | 102006048526 A | 4/2008 |

OTHER PUBLICATIONS

International Search Report & Written Opinion in PCT/EP2010/059878 dated Nov. 15, 2011.

* cited by examiner

*Primary Examiner* — Nguyen N Hanh
(74) *Attorney, Agent, or Firm* — Manelli Selter PLLC; Edward J. Stemberger

(57) ABSTRACT

The invention relates to an arrangement for acoustic decoupling of a stator of an electric motor having two substantially cylindrical decoupling rings disposed on both sides of the stator and concentric to a motor shaft, each fixed to a front side of the stator on one side and each fixed to a housing enclosing the stator on the other side, and comprising recesses on the circumferential surfaces thereof. The decoupling rings hold the stator in a centered position at a distance from the housing. The recesses allow targeted acoustic decoupling. The invention is particularly applicable for electric motors in steering systems for motor vehicles.

14 Claims, 2 Drawing Sheets

ARRANGEMENT FOR ACOUSTIC DECOUPLING OF A STATOR OF AN ELECTRIC MOTOR

FIELD OF THE INVENTION

The present invention relates to an arrangement for acoustic decoupling of a stator of an electric motor.

TECHNICAL BACKGROUND

In many applications, such as use of the electric motor for power-assisted steering in steering systems of motor vehicles, the acoustics or the structure-borne noise produced by an electric motor constitute a significant product feature. Different types (axial, radial, tangential and/or rotary) and strengths of vibration are brought about in electric motors depending on the configuration of the electromagnetic circuit. The configuration of the electromagnetic circuit of the electric motor is primarily determined by how many slots the stator comprises, how many pole pairs the rotor comprises, the magnet technology used—for example surface magnets or pocket magnets—and the winding scheme, and always involves an acoustic compromise which promotes one of the aforementioned vibration types. Optimisation of all of the relevant vibration types by way of the electromagnetic configuration is therefore only possible to a particular extent. Conventional motor constructions generally have a rigid connection between the stator and a housing which accommodates the stator. This means that all of the vibrations which cannot be suppressed by way of the electromagnetic configuration of the electric motor are introduced directly into the housing and the machine parts positioned thereon, leading to high noise production. However, such a high noise level is unacceptable in many applications.

It is known to use structural mechanical measures, such as decoupling or damping, to optimise the vibration types or components which are not suppressed or are only partially suppressed by way of the electromagnetic configuration of the electric motor.

DE 10 2004 050 743 A1 discloses a low-vibration vacuum pump in which the motor stator is suspended in the housing of the vacuum pump by means of resilient components such as elastomer rings, leading to vibrational decoupling of the motor stator.

However, with decoupling by way of resilient parts, it is difficult to provide sufficient acoustic decoupling at the same time as sufficient fixing and centring of the stator in the motor housing.

SUMMARY OF THE INVENTION

The object of the present invention is therefore to provide an arrangement for acoustic decoupling of a stator of an electric motor which provides sufficient acoustic decoupling as well as sufficient fixing and centring of the stator in a housing enclosing the stator.

This object is achieved by an arrangement for acoustic decoupling of a stator of an electric motor, comprising a stator, which is arranged in a housing so as to be concentric with a rotatable motor shaft and at a distance from the internal wall of the housing, a rotor, which is arranged inside the stator in the housing and rotationally engaged with the motor shaft, and two substantially cylindrical decoupling rings, which are arranged on either side of the stator so as to be concentric with the motor shaft, are each fixed both to an end face of the stator and to the housing, and comprise recesses on the peripheral surfaces thereof.

The recesses provided in the peripheral surfaces of the decoupling rings lead to good compensation of the vibrations, which are produced for example by local deformations of the stators, in such a way that said vibrations are barely transmitted to the housing.

In one embodiment of the invention, the recesses are evenly distributed over the peripheral surface of the decoupling rings and/or arranged mutually offset in a plurality of tracks. An arrangement of this type of the recesses makes it possible to achieve sufficient acoustic decoupling of the stator. However, the shape, number and arrangement of the recesses can in principle be selected freely, and are preferably adapted to the specific task, for example decoupling a particular type of vibration, and to the specific installation conditions. The recesses thus make targeted acoustic decoupling possible.

In a further embodiment of the invention, at least one pin or channel is provided on each of the end faces of the decoupling rings facing the stator, and engages in a corresponding channel of the stator or receives a corresponding pin of the stator as applicable. The decoupling rings are thus centred with respect to the stator in a simple manner.

At least one channel or pin may also be provided on the end face of a decoupling ring remote from the stator, and receives a corresponding pin of the housing or engages in a corresponding channel of the housing as applicable. The decoupling ring is thus fixed in rotation in the housing in a simple manner.

A further embodiment of the invention provides that in the axial direction of the motor shaft, the decoupling rings each comprise a first sub-region, facing the stator and having an external diameter less than or equal to the external diameter of the stator, and a second sub-region, remote from the stator and having an external diameter greater than the external diameter of the stator. This configuration of the decoupling rings means that the stator can be positioned reliably, in a simple manner, at a distance from the internal wall of the housing and at least substantially centred.

In a further embodiment of the invention, at least one of the decoupling rings is rigidly connected to an end shield, which receives a bearing of the motor shaft. In a further embodiment, at least one of the decoupling rings may also be formed integrally with the end shield. In this way, the number of motor components can be reduced and the manufacturing costs can thus be reduced.

It is advantageous for the decoupling rings to be sheet metal parts, in particular stamped and rolled sheet metal parts. This embodiment provides an economical manufacturing process without much scrap. This manufacturing process also makes it easy to provide any diameter stepping which may be required, i.e. a change in the external diameter between a first sub-region of the decoupling ring and a second sub-region of the decoupling ring.

However, the decoupling rings may also be deep-drawn parts, for example, and this is particularly advantageous if a decoupling ring is formed integrally with an end shield, and thus a cup-shaped component is to be produced overall.

BRIEF DESCRIPTION OF THE DRAWINGS

The present invention is explained in greater detail in the following by way of the embodiments shown in the figures of the drawings, in which.

DETAILED DESCRIPTION OF EMBODIMENTS OF THE INVENTION

Figure 1:
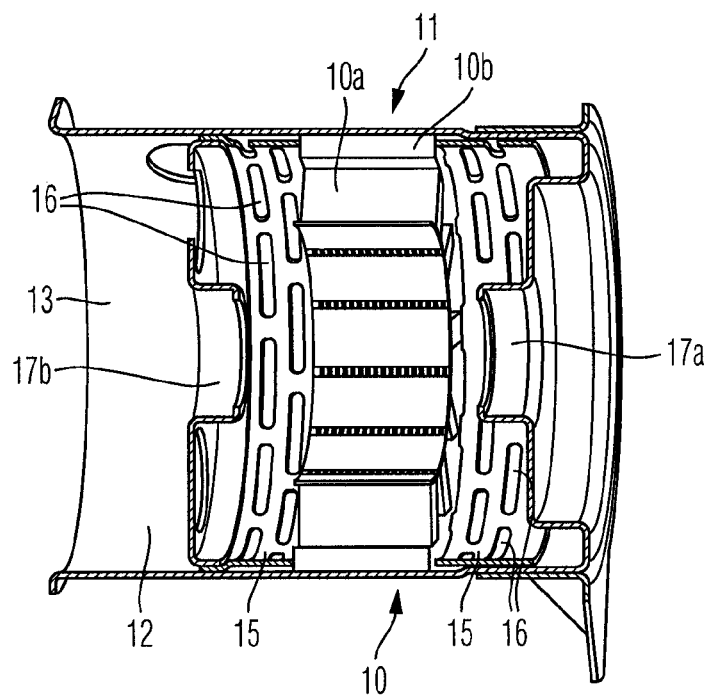
FIG. 1 is a schematic sectional view of a first embodiment of the arrangement according to the invention.

FIG. 1 is a perspective sectional view of a first embodiment of the arrangement according to the invention. A stator 10 of an electric motor 11 is arranged in a housing 12. In the embodiment shown, the stator 10 comprises an inner part 10a and an outer part 10b. The stator 10 does not touch the housing 12, and is instead arranged at a distance from an internal wall 13 of the housing 12. A rotor (not shown) is arranged inside the stator 10 and is rotationally engaged with a rotatable motor shaft (also not shown). The stator 10 is arranged concentric with the motor shaft. Decoupling rings 15 are provided on either side of the stator 10, and are fixed or fastened to the stator 10, for example by a welded joint. The decoupling rings are substantially cylindrical in configuration, and substantially continue the generated surface of the stator 10 in the axial direction of the motor shaft. In a sub-region of the peripheral surface thereof (cf. FIG. 2), the decoupling rings 15 are fixed to the substantially cup-shaped housing 12. They may for example be fixed by impression or shrinking or alternatively by an adhesive bond. Based on this arrangement, the decoupling rings 15 abut against the internal wall 13 of the housing 12 and position the stator 10 at least substantially centred with respect to the internal wall 13 of the housing 12.

Recesses 16 are provided in the peripheral surfaces of the decoupling rings 15, and are configured to compensate vibrations of the stator 10, in such a way that the vibrations are not introduced or are only introduced in a weakened form into the housing 12, and the stator 10 is thus acoustically decoupled. In the embodiment shown, recesses 16 in the form of slots are provided, arranged mutually offset in two parallel tracks or rows and evenly distributed over the peripheral surface of the decoupling rings 15. However, the shape, number and arrangement of the recesses 16 can in principle be selected freely. Since the compensatory effect of the decoupling rings 15 on vibrations of the stator 10 basically depends on the shape, number and arrangement of the recesses 16, it is advantageous for the configuration and distribution of the recesses 16 to be adapted to the respective task and the respective ambient conditions. The task may vary to the effect that only some forms of vibration are to be decoupled.

In a further embodiment of the invention, the decoupling rings 15 are sheet metal parts, since these can be produced cost-effectively and provide good fixing and centring of the stator 10 in the housing 12. The decoupling rings 15 may be a stamped and rolled sheet metal part, providing an economical manufacturing process without much scrap. Alternatively, however, the decoupling rings 15 may for example be deep-drawn parts. Naturally, other materials besides sheet metal, such as carbon, may be used for the decoupling rings 15. What is crucial is merely that the material used should be adapted both to provide sufficient fixing and centring of the stator 10 and to provide the required decoupling of the stator 10.

FIG. 1 further shows two end shields 17a and 17b, which each receive a bearing (not shown) of the motor shaft. In the embodiment shown, a first end shield 17a is formed integrally with the housing 12, and a second end shield 17b is formed as a separate component which is rigidly connected to one of the decoupling rings 15. It is also possible for a decoupling ring 15 to be formed integrally with an end shield 17a, 17b.

Figure 2:
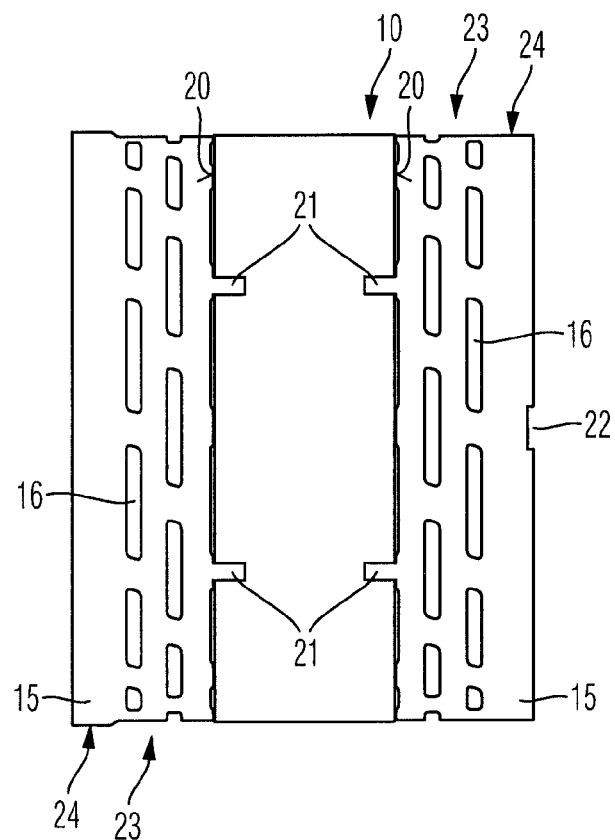
FIG. 2 is a schematic view of the stator and the decoupling rings fixed thereto.

The stator 10 and the decoupling rings 15 fastened to the end faces 20 thereof are shown again in somewhat greater detail in FIG. 2. In particular, pins 21 can be seen on the end faces of the decoupling rings facing the stator 10, which engage in corresponding channels of the stator 10 so as to centre the decoupling rings 15 with respect to the stator 10. Alternatively, channels may also be provided on the decoupling ring 15, and in this case corresponding pins of the stator 10 engage in said channels.

Further, at least one of the decoupling rings 15, in the example shown the right-hand decoupling ring, comprises a channel 22 on the end face remote from the stator 10, and said channel receives a corresponding pin (not shown) on the housing 12 and thus provides rotational fixing in the housing 12. Alternatively, a pin may be provided on the decoupling ring 15 for this same purpose, and in this case engages in a corresponding channel on the housing 12.

In the embodiment shown, the decoupling rings 15 do not have a uniform external diameter. In a first sub-region 23, facing the stator 10, the external diameter substantially corresponds to the external diameter of the stator 10. However, an external diameter of the decoupling rings 15 which is less than the external diameter of the stator 10 is also conceivable. By contrast, in a second sub-region, remote from the stator 10, the decoupling rings 15 have an external diameter which is greater than the external diameter of the stator 10. The decoupling rings 15 are fixed to the housing 12 exclusively in this second sub-region 24 of the decoupling rings 15. This configuration of the decoupling rings 15 provides reliable fixing and centring of the stator 10 in the housing 12, as well as sufficient decoupling of the stator 10, by simple means.

Figure 3:
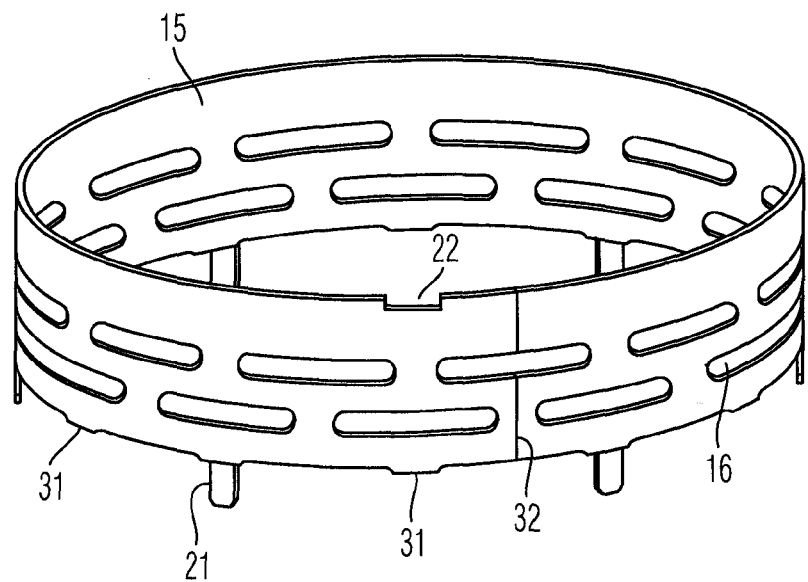
FIG. 3 is a schematic perspective view of a decoupling ring.

FIG. 3 is a perspective view of a decoupling ring 15 in isolation. In this case, in addition to the features disclosed in the above, contact surfaces 31 in the form of raised portions, by which the decoupling ring 15 is welded to the stator 10, can be seen on the end face of the decoupling ring 15 facing the stator 10. However, in this context welding is merely one of a number of possibilities for fixing or fastening the decoupling ring 15 to the stator 10. FIG. 3 further shows a seam 32, which may for example be a weld seam, which occurs in this or a similar form if the decoupling ring 15 is a stamped and rolled sheet metal part.

Figure 4:
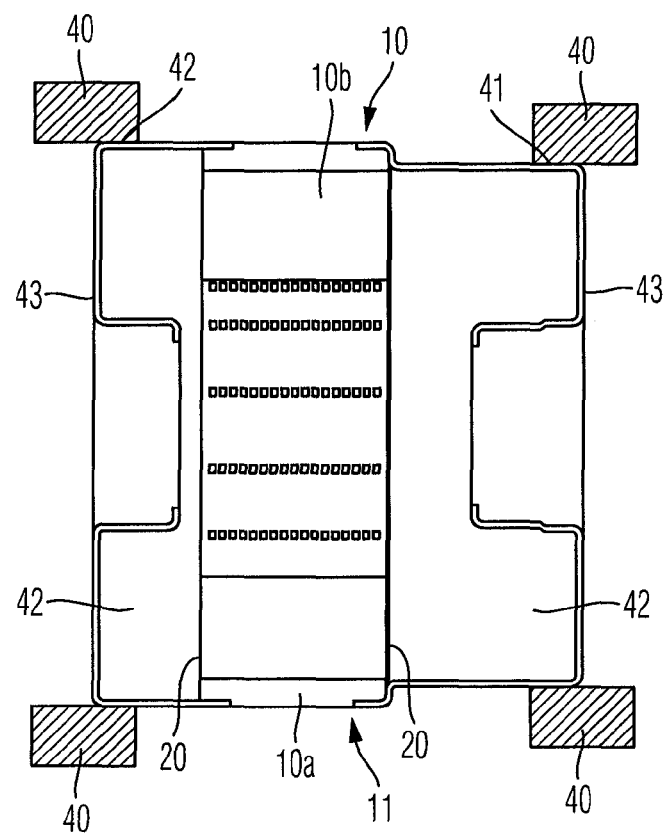
FIG. 4 is a schematic view of a second embodiment of the arrangement according to the invention.

FIG. 4 shows a second embodiment of the arrangement according to the invention, in which the electric motor is configured as what is known as a built-in motor, which for operation is installed in an installation hole provided therefor. In this case, unlike in the first embodiment shown in FIG. 1, the housing is in effect provided by the installation hole, instead of a housing in the form of a cup housing being provided. This housing 40 formed by the installation hole is merely shown schematically in FIG. 4 as four cuboid surfaces, in sub-regions 41 of decoupling rings 42 in which the decoupling rings 42 are fixed to the housing 40. As in the first embodiment, the decoupling rings are fastened to an end face 20 of the stator 10 as well as being fixed to the housing 40. They also have recesses on the peripheral surface thereof as in the first embodiment, but for simplicity these are not shown in FIG. 4.

In the embodiment of FIG. 4, the difference from the embodiment of FIG. 1 which is significant in terms of the invention is that the decoupling rings 42 are formed integrally with end shields 43, which each receive a bearing (not shown) of the motor shaft (not shown).

In this embodiment in particular, it is advantageous for the decoupling rings 42 to be deep-drawn parts, since in this way the entire cup-shaped structure of the decoupling rings 42 can be produced to a high quality at relatively low expense.

The statements made in relation to the operation, arrangement, configuration and material of the decoupling rings 15 according to the first embodiment of the invention apply equally to the decoupling rings 42 according the second embodiment of the invention.

List of Used Reference Numerals
- 10 stator
- 10a inner part of the stator
- 10b outer part of the stator
- 11 electric motor
- 12 housing
- 13 internal wall of the housing
- 15 decoupling ring
- 16 recess
- 17a, 17b end shield
- 20 end face of the stator
- 21 pin
- 22 channel
- 23 first sub-region of a decoupling ring
- 24 second sub-region of a decoupling ring
- 31 contact surface
- 32 seam
- 40 housing
- 41 sub-region of a decoupling ring
- 42 decoupling ring
- 43 end shield

The invention claimed is:

1. An arrangement for acoustic decoupling of a stator of an electric motor, comprising:
    a housing
    a stator, which is arranged in the housing so as to be concentric with a rotatable motor shaft and at a distance from an internal wall of the housing,
    a rotor, which is arranged inside the stator in the housing and rotationally engaged with the motor shaft, and
    two substantially cylindrical decoupling rings, which are arranged on either side of the stator so as to be concentric with the motor shaft, are each fixed both to an end face of the stator and to the housing, and comprise recesses on the peripheral surfaces thereof.

2. The arrangement of claim 1,
    wherein the electric motor is a brushless, permanently excited electric motor, which is used in particular in steering systems for motor vehicles.

3. The arrangement of claim 1,
    wherein the decoupling rings abut against the internal wall of the housing and position the stator at least substantially centred with respect to the internal wall of the housing.

4. The arrangement of claim 1,
    wherein the recesses are evenly distributed over the peripheral surface of the decoupling rings.

5. The arrangement of claim 1,
    wherein the recesses (16) are arranged mutually offset in a plurality of tracks.

6. The arrangement of claim 1,
    wherein the decoupling rings are fixed to the housing only in a sub-region of the peripheral surface of said rings.

7. The arrangement of claim 1,
    wherein at least one pin or channel is provided on each of the end faces of the decoupling rings facing the stator, and engages in a corresponding channel of the stator or receives a corresponding pin of the stator as applicable.

8. The arrangement of claim 1,
    wherein at least one channel or pin is provided on the end face of at least one decoupling ring remote from the stator, and receives a corresponding pin of the housing or engages in a corresponding channel of the housing as applicable.

9. The arrangement of claim 1,
    wherein in the axial direction of the motor shaft, the decoupling rings each comprise a first sub-region facing the stator and having an external diameter less than or equal to the external diameter of the stator, and a second sub-region, remote from the stator and having an external diameter greater than the external diameter of the stator.

10. The arrangement of claim 1,
    wherein at least one of the decoupling rings is rigidly connected to an end shield, which receives a bearing of the motor shaft.

11. The arrangement of claim 10,
    wherein the at least one of the decoupling rings is formed integrally with the end shield.

12. The arrangement of claim 1,
    wherein at least one of the decoupling rings is a sheet metal part.

13. The arrangement of claim 12,
    wherein at least one of the decoupling rings is a stamped and rolled sheet metal part.

14. The arrangement of claim 12,
    wherein at least one of the decoupling rings is a deep-drawn part.

* * * * *